United States Patent
Lueschow et al.

(10) Patent No.: US 6,601,013 B2
(45) Date of Patent: Jul. 29, 2003

(54) METHOD AND APPARATUS CONFIGURED TO DETERMINE THE WEIGHT OF A MACHINE PAYLOAD

(75) Inventors: Kevin J. Lueschow, Elmwood, IL (US); Ronald K. Scott, Buda, IL (US); Joel L. Peterson, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 47 days.

(21) Appl. No.: 09/742,467

(22) Filed: Dec. 20, 2000

(65) Prior Publication Data

US 2002/0111767 A1 Aug. 15, 2002

(51) Int. Cl.[7] .............................................. G01G 19/03
(52) U.S. Cl. ....................... 702/175; 702/33; 702/41; 702/44; 702/50; 702/173; 702/174; 177/136; 177/141
(58) Field of Search ............................ 702/175, 33, 41, 702/44, 50, 173, 174; 177/136, 141

(56) References Cited

U.S. PATENT DOCUMENTS

| 4,588,038 | A |   | 5/1986  | Takagi |
| 4,629,170 | A | * | 12/1986 | Warmuth, II ............ 267/64.21 |
| 4,630,227 | A |   | 12/1986 | Hagenbuch |
| 4,635,739 | A |   | 1/1987  | Foley et al. |
| 4,691,792 | A |   | 9/1987  | Shintani |
| 4,835,719 | A |   | 5/1989  | Sorrells |
| 4,839,835 | A |   | 6/1989  | Hagenbuch |
| 4,845,648 | A |   | 7/1989  | Hagenbuch |
| 4,919,222 | A |   | 4/1990  | Kyrtsos et al. |
| 5,067,572 | A |   | 11/1991 | Kyrtsos et al. |
| 5,070,953 | A |   | 12/1991 | Kyrtsos et al. |
| 5,082,071 | A |   | 1/1992  | Kyrtsos et al. |
| 5,182,712 | A |   | 1/1993  | Kyrtsos et al. |
| 5,610,372 | A | * | 3/1997  | Phillips et al. ................. 177/1 |

FOREIGN PATENT DOCUMENTS

| EP | 0 162 608 A1 | 11/1985 |
| WO | WO 89/01137  | 2/1989  |

* cited by examiner

*Primary Examiner*—John Barlow
*Assistant Examiner*—M. Walling
(74) *Attorney, Agent, or Firm*—W Bryan McPherson; Kelsey L Milman

(57) ABSTRACT

The present invention is configured to determine the weight of a payload of a mobile machine. When the machine is in motion, a force characteristic of the machine is compared with a force characteristic threshold, or range. The payload determination is based upon the force characteristic comparison, and the pressures sensed in at least one of the struts.

48 Claims, 5 Drawing Sheets

METHOD AND APPARATUS CONFIGURED TO DETERMINE THE WEIGHT OF A MACHINE PAYLOAD

TECHNICAL FIELD

This invention relates generally to an apparatus for accurately determining the weight of the payload carried by a mobile machine, and more particularly, to an apparatus and method configured to determine a payload weight supported by a suspension strut located on the mobile machine.

BACKGROUND ART

In the field in which off-highway trucks are used, for example in mining operations, it is desirable to determine the payload weight accurately. Accurate payload weight measurements are desired for several reasons including: avoidance of overloading and truck health reasons, site productivity management and fleet productivity management. It is also desirable to generate payload weight information quickly so that the loading tool operator can gauge the density of the material being loaded and then the loading technique to avoid underloading or overloading the next truck in the queue.

Some previous systems determine the payload weight while the machine is under the loading tool, before the machine has begun moving. This technique is poorly suited to machines that use the truck suspension system as a payload measurement system because loading floors tend to be uneven, suspension struts tend to stick under static conditions and shovel operators are prone to patting the load in the bed of the truck which causes the payload system to measure the loading tool as well as the material.

Once the truck moves away from the shovel, the conditions change drastically: the coefficient of static friction is replaced with the much smaller coefficient of dynamic friction in the struts, the haul roads tend to be much more even than the loading floor, and the truck is out of reach of the loading tool so only the payload is measured. One system disclosed in U.S. Pat. No. 45,182,712 to Kyrtsos, discloses determining the payload weight while the machine is in motion and after a significant compression condition of the strut is detected. That is, the weight is determined after the machine has begun moving and then encounters a discontinuity in the road's surface such as a pothole or bump to ensure that the struts are moving freely. Therefore the Kyrtsos system is dependent upon encountering a bump severe enough to cause a compression condition. However, a compression condition of this nature, may or may not occur during machine travel. In addition, depending on the dynamic forces associated with the machine, the payload weight is desirably determined prior to and independent of encountering a bump. Therefore, there are disadvantages associated with monitoring for an environmentally controlled triggering event that may or may not occur, before determining a payload weight.

In addition, there are dynamic forces acting upon/within the machine that affect the strut pressures of the machine. For example, a torque reaction, or torque windup, in the drive train can cause strut compression in the truck suspension system while the truck is moving. This strut compression is then seen by a payload measurement system as additional load, causing inaccuracy in the payload measurement. The dynamic forces effecting strut pressures, such as torque reaction, are desirably minimized before the payload weight is determined.

The present system is directed at overcoming one or more of the problems set forth above.

DISCLOSURE OF THE INVENTION

In one aspect of the present invention, a method for determining the weight of a payload loaded onto a mobile machine is disclosed. The mobile machine has a plurality of hydraulic struts in supporting relation to the payload. The method comprises the steps of establishing a force characteristic indicative of a dynamic force associated with the machine, establishing an internal pressure of at least one of the payload support struts, and determining the payload weight in response to the force characteristic, and the established strut pressure.

In another aspect of the present invention, an apparatus configured to determine the weight of a payload loaded onto a mobile machine is disclosed. The machine has a plurality of hydraulic struts in supporting relation to the payload. The apparatus comprises at least one of sensing device configured to sense an internal pressure of one of the struts, and responsively generate a pressure signal, a second sensing device configured to sense a parameter indicative of a dynamic force of the machine, and responsively generate a force characteristic signal, a controller is configured to receive the pressure signals and the force indicative signal, and determine the payload weight in response to said force characteristic, the machine being in motion, and the sensed strut pressure.

BEST MODE FOR CARRYING OUT THE INVENTION

Figure 1:
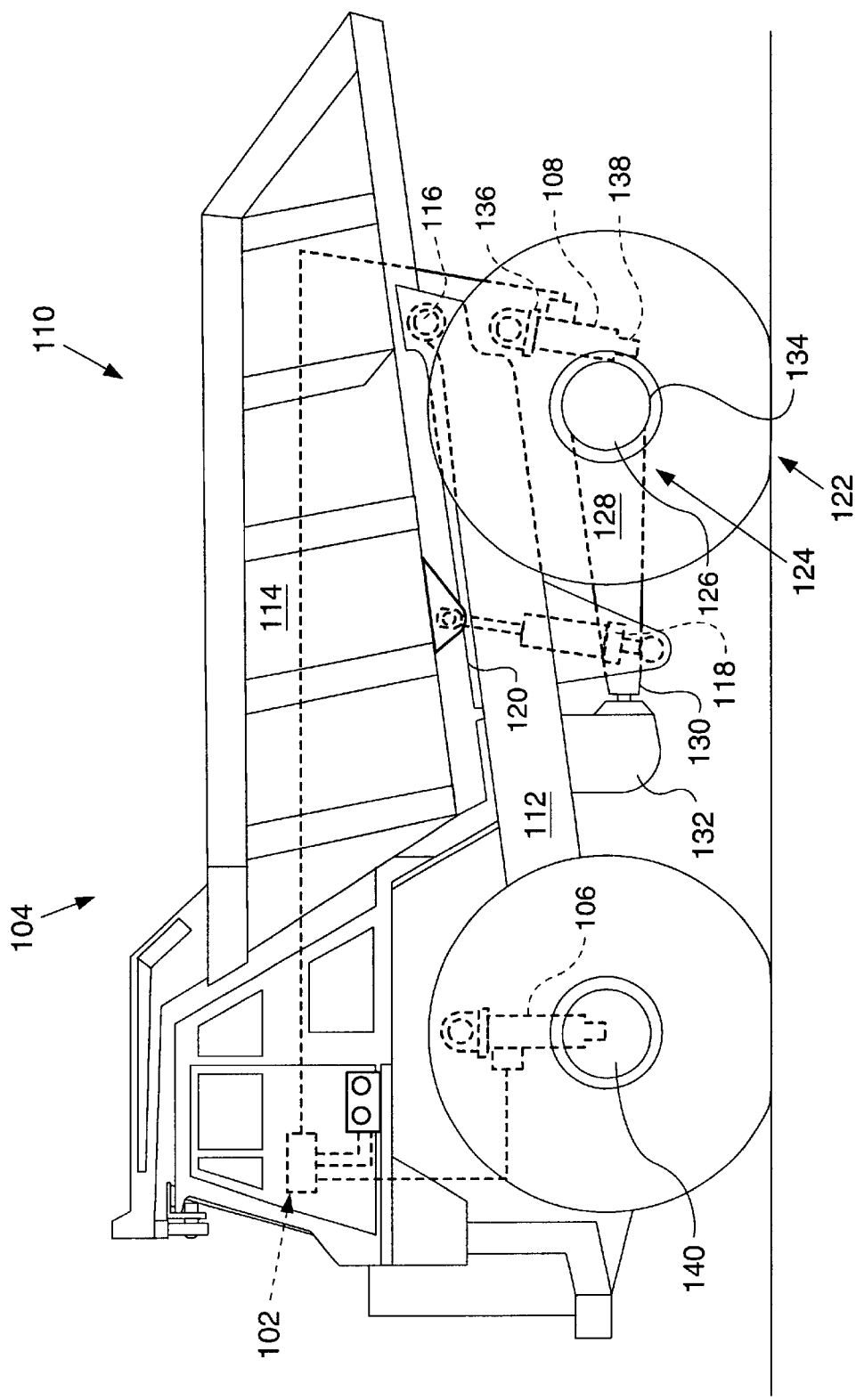
FIG. 1 is a diagrammatic view of an off-highway truck showing one embodiment of the location of suspension components.

The present invention provides a method and apparatus configured to determine the weight of a payload loaded onto a mobile machine. FIG. 1 illustrates one embodiment of a control module 102 associated with the present invention located on a mobile machine 104, such as an off-highway truck. The mobile machine 104 has at least one front and one rear strut 106, 108 disposed in supporting relation to a load carrying portion 110 of the work vehicle 104. The preferred embodiment has two front and two rear struts 106L, 106R, 108L, 108R (of which only 106 and 108 are illustrated in FIG. 1) which are the gas-over-liquid type commonly known in the industry and not described herein. It is sufficient in the understanding of the present invention to recognize that the pressure of the fluid in the strut is indicative of the magnitude of the load applied to the struts 106, 108.

In one embodiment of a mobile machine 104, the load carrying portion 110 of the machine may include a vehicular frame 112 and dump body 114. The dump body 114 may be connected to the frame 112 by a pivot pin 116 and a hydraulic cylinder 118 such that the contents of the dump body 114 can be removed by controllably pressurizing the cylinder 118 to effect pivotal movement of the dump body 114 about the pivot pin 116. In the transport mode, the cylinder 118 is not pressurized and the weight of the dump body is transferred to the frame 112 through the pivot pin 116 and a support pad 120 fixed to the frame 112.

The mobile machine 104 further includes a ground engaging portion 122 and a suspension means 124 for supporting the load carrying portion 110 in a manner to provide damped oscillatory motion between the ground engaging portion 122 and the load carrying portion 110. Therefore, in one embodiment, the force function of the road at time, t becomes:

$$f(t)=mx''+Cx'+Kx$$

where,
- m is the mass supported by the strut,
- C is the damping coefficient of the strut
- k is the spring constant of the strut,
- x is the position of the strut,
- x' is the velocity of the strut, and
- x" is the acceleration of the strut.

The suspension means 124 includes a rear axle housing 126 and an A-frame moment arm 128. The A-frame moment arm 128 has a first end portion 130 pivotally connected to the vehicular frame 112 by a socket 132, and a second end portion 134 fixedly connected to the rear axle housing 126. The first end portion 130 of the A-frame moment arm 128 may be a king bolt arrangement, substantially spherical in shape and retained from lateral movement by the socket 132. The rear strut 108 has a first end portion 136 pivotally connected to the vehicular frame 112 and a second end portion 138 pivotally connected to the second end portion 134 of the A-frame moment arm 128.

During loading of the machine 104, as the payload increases, the load carrying portion 110 will be displaced in a direction toward the ground engaging portion 122. The rear strut 108 begins to compress while the A-frame moment arm 128 pivots about the first end portion 130. In one embodiment, a distance L2 is defined to be the distance between the first end portion 130 pivot point and the second end portion 134 pivot point of the arm 128. Therefore, it can be shown that the rear strut pressure differential is a function of the suspension apparatus 124. Moreover, the rear strut pressure differential can be related to the reaction force R between a work surface and the ground engaging portion 122. A force S experienced by the rear strut 108 can be determined by measuring the internal pressure of the strut 108, subtracting the rear strut pressure corresponding to an unloaded truck, and multiplying the differential pressure by the area of the strut 108. The reaction force R is proportional to the payload of the vehicle 104 and can be assumed to act through the center of the rear axle housing 126 such that a summation of the moments about the pivot point of the first end portion 130 would derive the following equation:

$$R=S*L2/L3$$

where the horizontal distance between the first end portion 130 pivot point and the center of rear axle housing 126 is defined to be L3.

Similarly, the front strut 106 will be compressed as the load increases; however, the front strut is connected directly between the frame 112 and a front axle housing 140. A more straightforward relationship exists here in that a force F experienced by the front strut 106 can be determined by measuring the internal pressure of the strut 106, subtracting the front strut pressure corresponding to an unloaded truck, and multiplying the pressure by the area of the strut 106. The reaction force F between the ground engaging portion 122 and the work surface is substantially equivalent to the force F experienced by the front strut 106.

Figure 2:
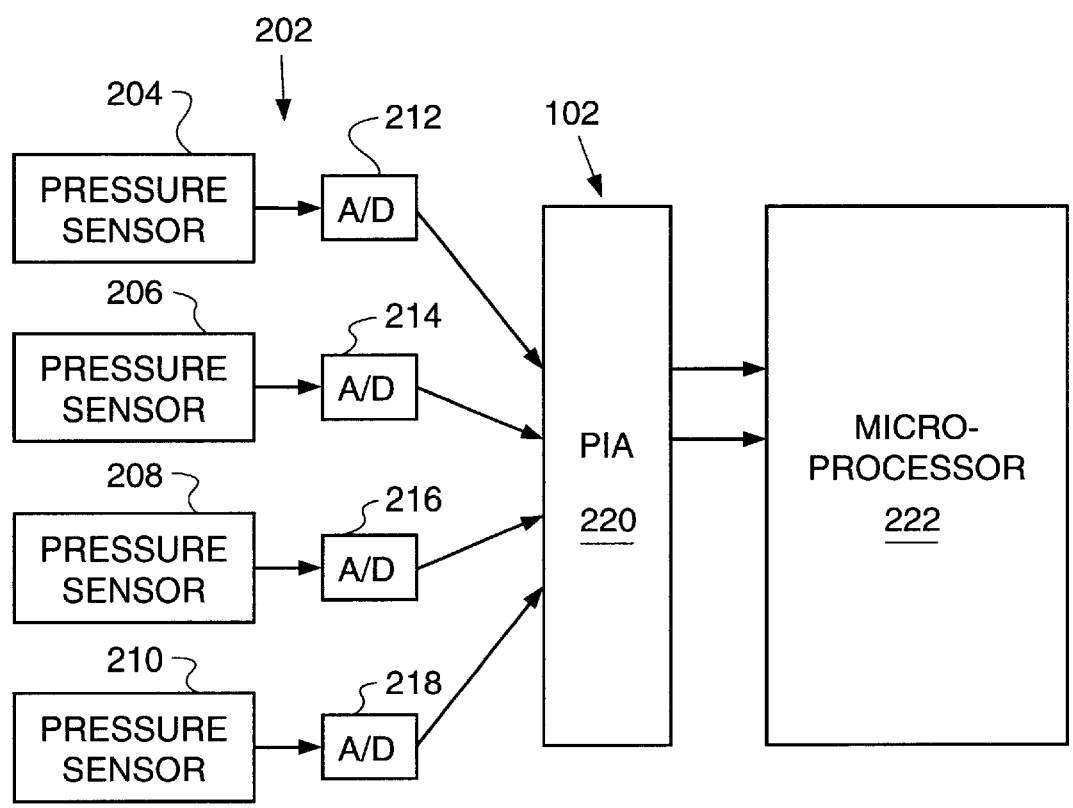
FIG. 2 is a block diagram of the payload monitor.

The control module 102 is shown in FIG. 1 to illustrate the relationship between the mobile machine 104 and the location of the control module 102. FIG. 2 illustrates one embodiment of the payload monitoring system 240 associated with the present invention. The payload monitoring system 240 may include a plurality of sensing devices 204, 206, 208, 210 configured to sense a parameter indicative of the pressures of each of the struts 106, 108. Each sensing device delivers a signal responsive to the internal pressures of a respective strut to the control module 102 for processing. In the preferred embodiment, the sensing devices 204, 206, 208, 210 are pressure sensors, associated with the two front struts 106L, 106R and the two rear struts 108L, 108R. In one embodiment, there is one sensor for each strut. In an alternative embodiment, fewer pressure sensors may be used, e.g., two: one for one of the front struts 106, and one for one of the back struts 108.

In one embodiment, each of the pressure sensors 204, 206, 208, 210, as illustrated in FIG. 2, delivers an analog signal proportional to the magnitude of the pressure of the respective strut 106L, 106R, 108L, 108R to respective analog to digital converters (A/D) 212, 214, 216, 218. The A/D's 212, 214, 216, 218 can be of the type commercially available from Analog Devices as part number AD575A. Other types of A/D converters are available, and the choice of the particular A/D disclosed herein is simply a matter of designer discretion. The selection of a device which provides an analog to frequency output is particularly well suited to the digital microprocessor environment disclosed herein. For example, the output of the pressure sensing device may be a frequency signal which is converted to a digital pressure signal via a time processor unit (not shown), which is delivered to the controller. Therefore, other similar devices could be easily substituted without departing from the spirit of the invention. The A/D converters 212, 214, 216, 218 may deliver the signals to a peripheral interface adapter (PIA) 220, associated with the control module.

In an alternative embodiment, a time processor unit (TPU) 220, associated with the control module, may be configured to receive the frequency signal output by the pressure sensors and deliver these signals as digital signals to a controller, or micro-processor 222, under software control.

The controller 102 is configured to determine the weight of a payload loaded onto the mobile machine. In one embodiment of the present invention, the controller 102 is configured to establish the machine is in motion, establish a force characteristic indicative of a dynamic force associated with the machine, compare the force characteristic with a force characteristic threshold, establish an internal pressure of at least one of said payload support struts, and determine the payload weight in response to the machine being in motion, the force characteristic comparison, and the established strut pressure.

Figure 3:
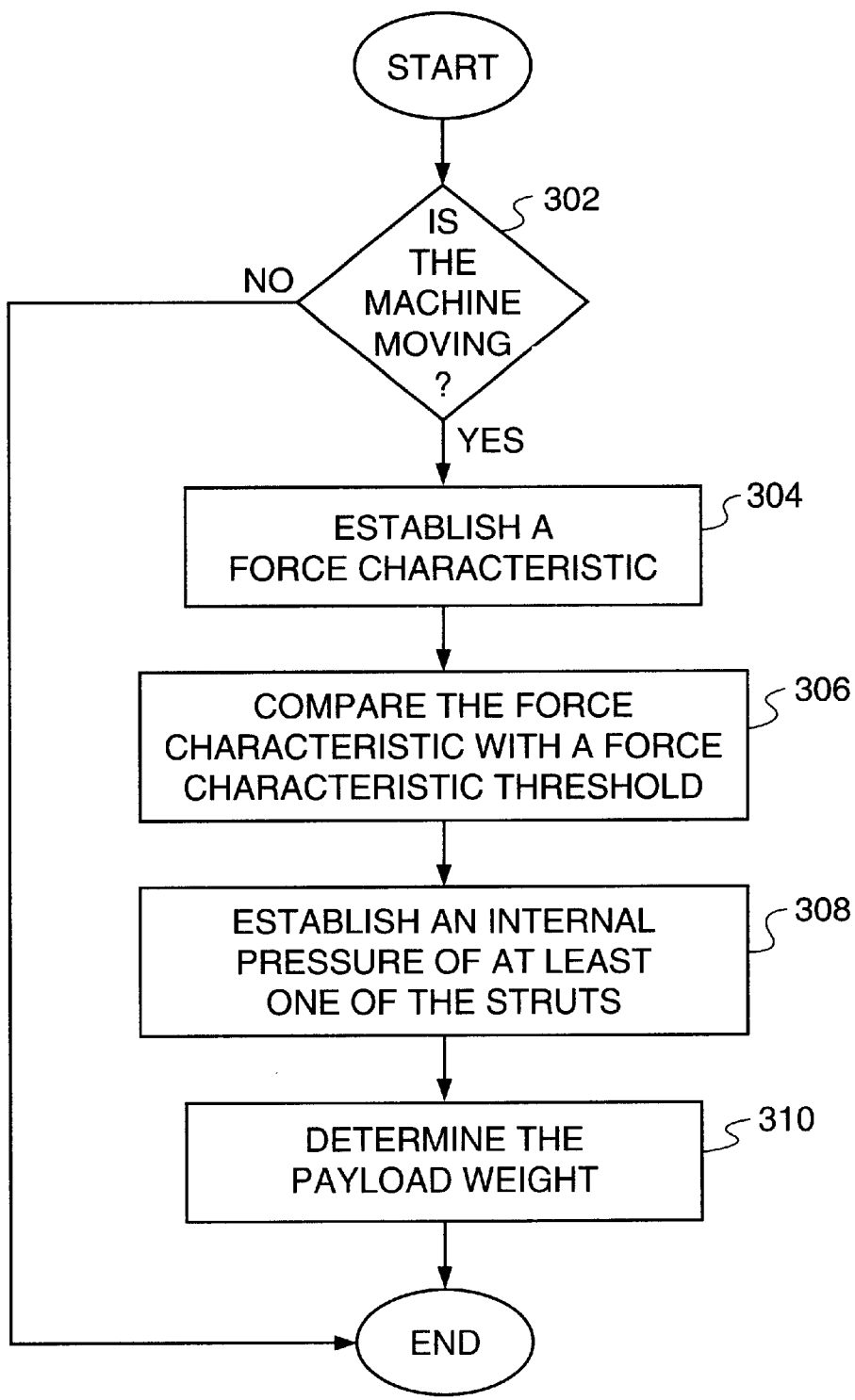
FIG. 3 is a flow diagram illustrating one embodiment of the operation of the payload monitor.

FIG. 3 illustrates one embodiment of a method of the present invention. In a first decision block 302, the method establishes whether the machine is in motion. In one embodiment a speed sensor may be used to determine the speed of the machine. If the speed exceeds a speed threshold, the machine may be determined to be in motion. Alternatively, in one embodiment, if the speed sensor indicates the speed is non-zero, the machine may be determined to be in motion. If the machine is not in motion then control passes to the end of the method. If the machine is in motion, control passes to a first control block 304, and a force characteristic indicative of a dynamic force associated with the machine is established. In one embodiment, the dynamic force may include either forces associated with mass reactions of the machine, forces associated with torque reactions of the machine, or both. Examples of these forces are provided below. When a machine begins to move away from a loading area, there are dynamic forces associated with the machine, payload, and/or machine movement which cause strut compression or decompression which leads to inaccurate payload weight measurements. After a period of time, depending on the driving conditions of the machine and the force at issue, the dynamic forces reduce to a stable steady state condition. Accordingly, there are forces that are placed on the struts 106, 108 due to these dynamic forces during the operation of the machine, that lead to inaccurate strut pressure readings. Therefore the dynamic forces desirably reduce below a force threshold before the weight of the payload is determined. Accordingly, a force characteristic indicative of the dynamic forces associated with the machine, is established.

In a second control block 306, the established force characteristic is compared with a force characteristic threshold. In the preferred embodiment, the comparison is performed to determine if the dynamic force has reduced to below an acceptable threshold level.

In a third control block 308, the internal pressure of at least one of the struts is established. While the strut pressures may be continually monitored throughout machine operation, the strut pressures that occur after the machine has begun moving and the torque characteristic indicates an acceptable torque reaction level, are preferably the values that are used for the weight determination. Accordingly, the internal pressure of at least one of the payload support struts is established, preferably by sensing the pressure. In the preferred embodiment, the pressure of each of the struts 106L, 106R, 108L, 108R, is sensed.

In a fourth control block 310 the payload weight is determined in response to the machine being in motion, the force characteristic comparison, and the sensed strut pressure. That is, the payload weight is determined once the machine is in motion and the dynamic force(s) is within an acceptable range, or below a threshold, in response to the sensed strut pressures.

In one embodiment, the load on the front strut may be determined. The load may be calculated as mass in the International System of Units (SI) unit of kilograms (kg). In another embodiment, the load is calculated as weight using the SI unit, Newton (N) or the English unit, pound (lb). In one embodiment, the mass supported by the front strut 106 is calculated using the formula:

$$\frac{P_2 A^2 x (\Delta t)^2}{V_0 x (1 - 2x(P_0/P_1) + (P_0/P_2))}$$

Where:

A is the area of the strut, and $V_0$ is the initial volume of the strut. If the payload is to be calculated as weight or force, the above equation is multiplied by g, the gravitational constant.

The load supported by the other front strut 106 and the two rear struts 108 may be calculated in a similar manner. The total payload is calculated as the sum of the loads, or mass's as indicated above, supported by each individual strut 106, 108.

In one embodiment, multiple sensed pressure readings from each strut sensor may be used to determine the payload weight. For example, multiple sensor readings from a strut may be averaged together to determine a strut pressure average. This may be done for the data associated with each of the struts. The averaged data may then be used to determine the payload weight according to the method illustrated in FIG. 3.

In one embodiment, once the payload weight of the machine has been determined, the weight may be illustrated on a display (not shown) located on the side of the machine. The display may be used to show a loading operator, e.g., the operator of an excavator or wheel loader, how much weight was placed in the machine. Therefore, the operator can make loading adjustments if desired, on the remaining machines to be loaded.

Figure 4:
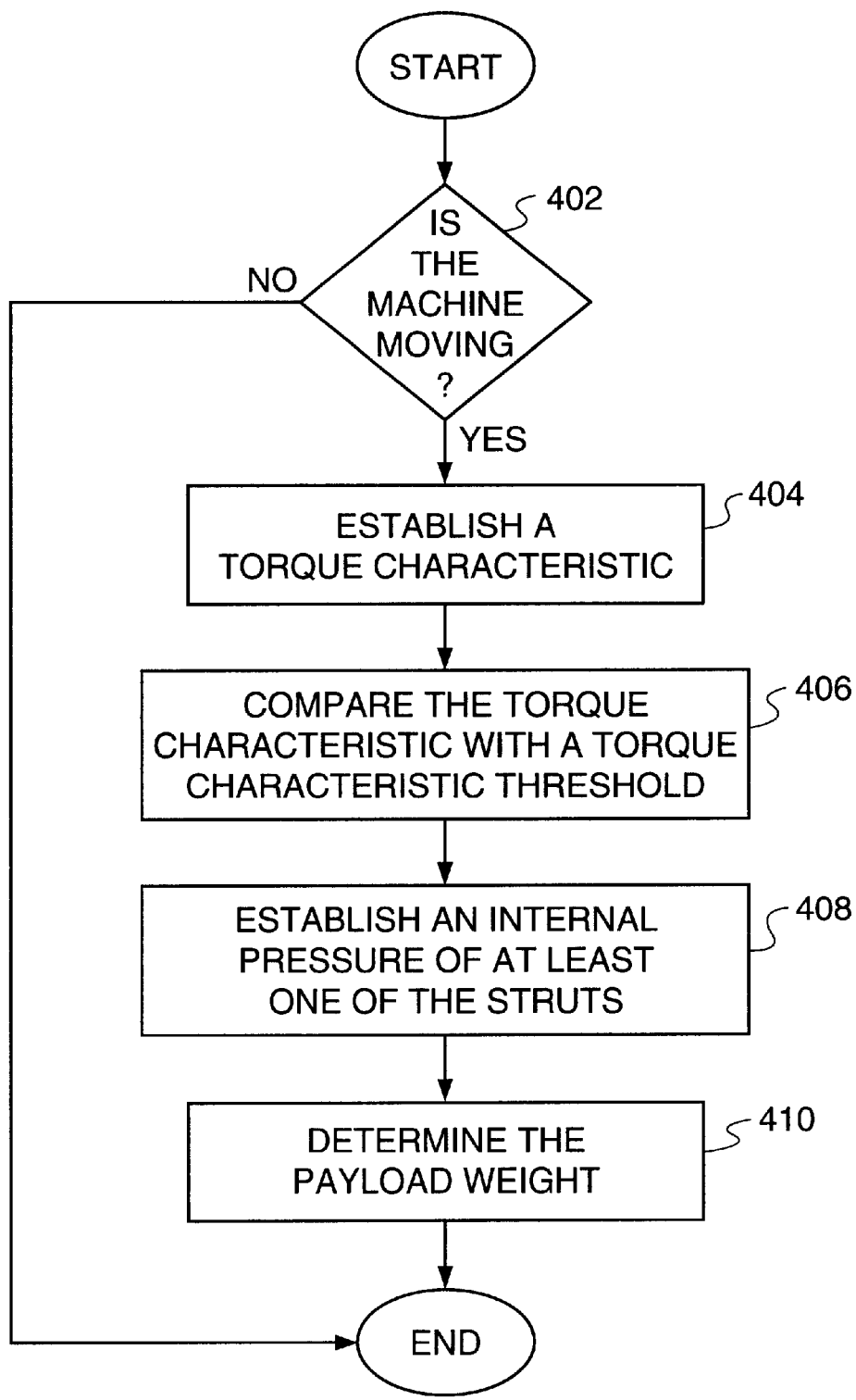
FIG. 4 is a flow diagram illustrating one embodiment of the operation of the payload monitor.

FIG. 4 illustrates one embodiment of a method of the present invention, where the dynamic force associated with the machine includes a torque reaction. In a first decision block 402, as done in the first decision block 302 of FIG. 3, the method establishes whether the machine is in motion. If the machine is in motion, control passes to a first control block 404, and a force characteristic indicative of a dynamic force associated with the machine is established. In this embodiment, the force characteristic is a torque characteristic indicative of a torque reaction of the machine is established. In one embodiment, torque reaction may be described as the reaction of the machine to a change in torque generated by the engine, which causes one or more struts to compress. Examples of changes in torque include: from a stopped position, the engine throttle may be increased, or the transmission may be placed from neutral into a desired gear, or during motion the transmission gear may be changed, thereby causing a change in torque in the machine drivetrain, and a torque reaction by the machine in general. For example, as the wheels of the machine begin to rotate during the initial movement (e.g., forward direction) of the machine, the rear struts begin to compress and the front struts decompress. Therefore, the torque reaction has an effect on the compression of the struts. After a period of time, depending on the driving conditions of the machine, the torque reaction reduces to a stable steady state condition. Accordingly, there are forces that are placed on the struts 106, 108 due to the torque reaction during the initial motion of the machine, for example, that lead to inaccurate strut pressure readings. Therefore, the torque reaction desirably reduces below a torque threshold before the weight of the payload is determined. Accordingly, a torque characteristic indicative of the torque reaction of the machine, is established.

In a second control block 406, the established torque characteristic is compared with a force characteristic threshold, which is a torque characteristic threshold in this embodiment. In the preferred embodiment, this comparison is performed to determine if the torque reaction has reduced to within an acceptable threshold level. In the preferred embodiment, the torque characteristic is the current gear of the transmission, e.g., first, second, third etc. The torque characteristic threshold may be a transmission gear threshold, e.g., second gear. That is, in one embodiment, the current gear the transmission is placed in may be used as an indicator of the torque reaction experienced by the struts. If the current gear is equal to or greater than second gear, then the torque reaction may be determined to have reduced to the point that an accurate payload weight may be determined. The selection of the gear threshold, e.g., second gear, is implementation dependent and may be determined through empirical analysis. For example, a known payload may be loaded into the mobile machine. The machine may then begin traveling. The strut sensor data may be collected and correlated with the gear of the machine to determine at what point the strut data enables an accurate determination of the payload. The gear the machine is in at that point in time may be used as the gear threshold.

In an alternative embodiment, either the machine speed, or the engine speed may be used as the torque characteristic, and a machine or engine speed may be used as the torque threshold, respectively. Again, empirical analysis may be performed to determine at what machine, or engine, speed the torque reaction subsides to an acceptable level such that the strut pressures are accurately indicative of the payload weight.

In one embodiment, a combination of time, transmission gear, and engine or machine, speed may be used as the torque characteristic. For example, the torque, or torque reaction, may increase initially as the machine changes from a first to a second gear, depending on the speed of the engine or machine. Therefore, a time delay may be used after a machine changes gears, before determining the payload weight. The time delay will enable any fluctuations in torque or torque reaction that occur due to the gear change and the speed at which the change occurred, to reduce to an acceptable level.

Figure 5:
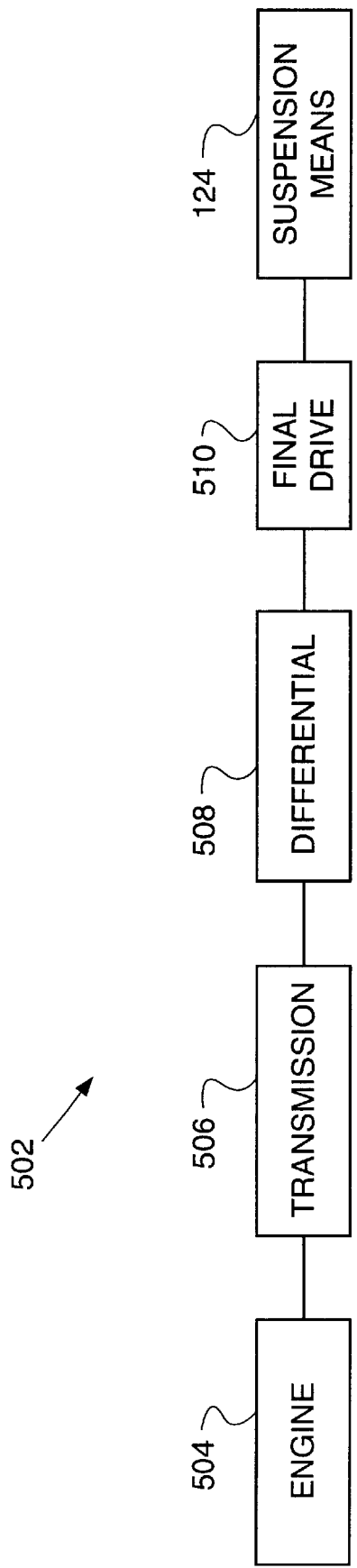
FIG. 5 is an illustration of an engine and associated drivetrain of a machine.

In one embodiment, a drivetrain torque may be calculated and compared to a torque threshold. If the drivetrain torque exceeds the torque threshold, then a torque reaction may be considered to be occuring. For example, FIG. 5 shows a high level illustration of one embodiment of an engine 504 and associated drivetrain 504 of an engine. The engine 504 is connected to a transmission 406 which is connected to a differential 508, which is connected to the final drive 510 of the machine. The final drive 510 is connected to the rear axle of the suspension means 124. The fuel system (not shown) of the engine 504 may be used to determine the fuel consumed by the engine 504. The torque output of the engine may be determined in response to the fuel consumption. Alternatively, the speed of the engine may be monitored (via an engine speed sensor for example), and used to determine the torque output of the engine 504. For example, the current gear of the transmission 506 may be determined. The current gear and current engine speed may be used in conjunction with one or more torque curves to determine the current torque output of the engine 504. In one embodiment, each gear of the transmission has a torque curve which correlates an engine speed with a torque output for that particular gear. The gear ratio of the transmission may be used to determine the torque output of the transmission 506. In addition, the torque output of the differential may be determined in response to the torque output of the transmission. A torque conversion value may be empirically determined and used to translate the torque output of the transmission to the torque output of the differential. An analogous torque conversion value may be used to determine the torque output of the final drive 510. The determined torque of the final drive 510 may be compared to a torque threshold. The torque output of the final drive 410 being less than the torque threshold is indicative of the torque reaction being within an acceptable range, and therefore then the payload weight is desirably determined.

In another embodiment, a drivetrain torque sensor, or a strain gauge sensor, may be used to establish an accurate determination of the torque reaction experienced by the struts. Once the drivetrain torque reaction has reduced below a threshold, as determined via the strain gauge sensor inputs, the torque reaction of the machine may be determined to have reduced to an acceptable level, and the payload weight may be determined. For example, the strain gauge sensor may be located after the final drive 510. The torque signal generated by the strain gauge sensor may be used to determine an expected torque value established in response to the current gear of the transmission 506 and speed of the engine 504. The torque signal being less than a torque threshold is indicative of the torque reaction being within an acceptable range, and therefore then the payload weight is desirably determined.

In a third control block 408, the internal pressure of at least one of the struts is established, as described with the third control block 308 of FIG. 3. In a fourth control block 410, the payload weight is determined in response to the machine being in motion, the torque characteristic comparison, and the sensed strut pressure. That is, the payload weight is determined once the machine is in motion and the torque reaction is within an acceptable range, or below a threshold, in response to the sensed strut pressures.

In one embodiment, a timer may be started once the machine is determined to be in motion. Once the time exceeds a time threshold a payload weight may be determined. That is, time may be used as the torque characteristic. For example, emperical analysis may indicate that through the general operation of a particular type of machine, the torque reaction is within an acceptable range, or threshold, once the machine is in motion for a given amount of time. That is, if the operators routinely apply approximately the same throttle request, and change gears at about the same engine speed, then the strut pressures may be monitored to determine when an accurate payload may be determined. For example, if a known payload weight is used, the controller may calculate a payload weight based on the sensed pressures, to determine when the calculated payload weight is within a threshold of the known weight. Once this determination is made, it may be determined approximately how long after the machine began to move that the strut pressures were accurately indicative of the payload weight. Then, during the operation of the machine, a time delay may be used after the machine has begun moving. After the time delay, the payload weight may be determined.

In an alternative embodiment, a distance traveled may be used as the torque characteristic. As above, a distance traveled may be emperically established, based on routine operation for example, in order to determine how far from the loading area the machine has traveled before the strut pressures are accurately indicative of the actual payload weight. Once the machine has traveled beyond the distance threshold, the payload weight may be determined and displayed.

In another embodiment of the present invention, the dynamic force includes a mass reaction associated with the machine, payload, and/or payload motion. In one embodiment, the mass reaction associated with the machine and/or payload may be described as the reaction of the mass of the machine and/or payload to forces external to the machine. For example, as the machine is climbing a hill, the mass reaction caused by the change in center of gravity of the machine and payload may will cause one or more struts to compress. For example, as the machine climbs a hill, the rear struts will compress more than if the machine was traveling across a level road. Variations in the slope of the road cause analogous variations in strut pressures. For example, the steeper the hill, the more rear struts are compressed.

Therefore, in one embodiment, the method of the present invention establishes a force characteristic indicative of a dynamic force of the machine, where the force characteristic is mass reaction characteristic indicative of the mass reaction associated with the machine. The mass reaction characteristic is then compared with a force characteristic threshold, which in this embodiment is a mass reaction characteristic threshold.

For example, in one embodiment the machine includes two sensing devices (not shown) configured to sense a parameter indicative of a pitch of the machine. Examples of applicable sensing devices include inclinometers, accelerometers, pitch sensors, and pitch rate sensors. The sensing devices are configured to sense a pitch of the machine and responsively deliver a pitch signal to the controller 222. One sensing device may be associated with the dump body 114 of the machine, and one sensing device may be associated with the ground engaging portion 122 of the machine. In this manner, mass reactions due to machine acceleration, velocity, or attitude changes may be accounted for. For example, the pitch of the dump body and the ground engaging portion 122 may be monitored. As the machine accelerates, the pitch of the dump body may increase relative to the pitch of the ground engaging portion 122. In one embodiment, the difference between the pitch of the dump body and the pitch of the ground engaging portion may be monitored. If the difference between the two pitches is not less than a mass reaction threshold, e.g., a delta pitch threshold, then the payload is not determined. That is, once the machine is determined to be in motion, and the difference between the pitch of the dump body and the pitch of the ground engaging portion of the machine is less than a delta pitch threshold, then the payload weight may be determined.

In one embodiment, the sensing device associated with the ground engaging portion 122 may be monitored to determine the pitch of the ground engaging portion 122. The ground engaging portion 122 pitch may compared with a ground engaging portion pitch threshold. If the sensed pitch is not less than the ground engaging pitch threshold, then the method does not calculate the payload. That is, once the sensed pitch is less than the ground engaging pitch threshold, then the payload weight may be determined. In this manner, the payload weight is not determined if the machine is climbing a hill, or traversing a large slope, which would cause an unacceptable mass reaction leading to an erroneous payload weight calculation. Therefore, in one embodiment, once the machine is determined to be in motion, and a pitch characteristic is determined to be less than a pitch characteristic threshold, then the payload weight of the machine may be determined.

In an alternative embodiment, one pitch sensing device may be used to determine information associated with the acceleration, velocity, and/or attitude of the machine.

In one embodiment, a sensing device (not shown), such a strain gauge sensor may be connected to the load carrying portion 114 in a manner to sense the lateral load placed on the machine. The sensing device may be configured to sense a load placed on the machine, and responsively deliver a load signal to the controller. For example, if the lateral load associated with the dump body increases from one time period to another, then a force due to either a mass reaction, or torque reaction is being placed on the struts. Therefore, in the preferred embodiment, the sensing device may be monitored, and the payload is not determined until the machine is in motion, and the the load signal (force characteristic) is less than a load threshold (force characteristic threshold).

In one embodiment, both the forces associated with the mass reaction associated with the machine and the torque reaction of the machine may be monitored. The payload weight is not determined until the machine is in motion and each of the force characteristics being monitored is less than a respective force characteristic threshold.

In one embodiment, instead of, or in addition to using the machine display to communicate the weight information to the operator, a wireless communication system may be used to transmit the data to the operator, or a remote data facility, and the information may be displayed to the operator.

INDUSTRIAL APPLICABILITY

With reference to the figures and in operation, the present invention is configured to determine the weight of a payload of a mobile machine 104, e.g., a mining truck. The mining truck 104 is loaded in a conventional manner by a loader (e.g., a wheel loader or excavator). The number of bucket loads needed to fill the load carrying portion 110 of the mobile machine 104 is dependent upon the size of the load carrying portion 110 and the size of the loader's bucket.

In one embodiment, when the machine is in motion, the payload weight is determined once the dynamic forces effecting the struts is/are within an acceptable threshold, or range. The payload determination is based upon the pressures sensed in at least one of the struts 106, 108. While a weight of the payload may be determined during loading, a more accurate estimate of the payload weight is achieved when the machine is in motion, after loading. The payload weight determination made after the machine is in motion, and the torque reaction, for example, is below an established threshold, is more accurate because the torque reaction causes the struts to compress. Strut compression due to torque reaction as opposed to payload weight leads to inaccurate payload determinations. Therefore, as discussed above, determining the payload weight when the dynamic forces acting on the struts have minimized, or achieved an acceptable level, enables a more accurate weight determination than simply waiting until the machine begins to travel, and aleviates the dependency of prior systems on environmental induced trigger events, such as bumps causing compression conditions in the struts before determining a payload weight.

The determined payload may then be communicated to the loading operator so that the operator may adjust the loading of the following machines accordingly. Dynamic forces effecting the strut pressures include mass reactions and torque reactions. Torque characteristics which are indicative of the torque reaction of the machine include, the current gear of the transmission, the current engine or machine speed, the time or distance traveled in a particular gear, or from the loading area, a determined torque of the drivetrain associated with the transmission, and a sensed torque of the drivetrain associated with the transmission.

Mass reaction characteristics which are indicative of the mass reaction associated with the machine include, attitude of the machine, or attitude of the ground engaging portion of the machine and/or the dump body of the machine, and the lateral loads placed on the machine.

One embodiment of the present invention includes a method and apparatus configured to determine the weight of a payload loaded onto a mobile machine. The method includes the steps of establishing whether the machine is in motion, establishing a force characteristic indicative of a dynamic force associated with the machine, comparing the force characteristic with a force characteristic threshold, sensing an internal pressure of at least one of said payload support struts, and determining the payload weight in response to the machine being in motion, the force characteristic comparison, and the sensed strut pressure.

Other aspects, objects, and advantages of the present invention can be obtained from a study of the drawings, the disclosure, and the claims.

What is claimed is:

1. A method for determining the weight of a payload loaded onto a mobile machine, the mobile machine having a plurality of hydraulic struts in supporting relation to the payload, comprising the steps of:
   establishing the machine is in motion;
   establishing a force characteristic indicative of a dynamic force associated with the machine;
   comparing said force characteristic with a force characteristic threshold;
   establishing an internal pressure of at least one of said payload support struts; and
   determining the payload weight in response to said machine being in motion, said force characteristic comparison, and said established strut pressure.

2. A method, as set forth in claim 1, wherein the step of comparing said force characteristic includes the step of determining said force characteristic is less than a force characteristic threshold, and wherein the step of determining the payload weight includes the step of determining the payload weight in response to said machine being in motion, said force characteristic being less than said force characteristic threshold, and said established strut pressure.

3. A method, as set forth in claim 1, wherein said force characteristic includes one of a mass reaction characteristic and a torque characteristic, said mass reaction characteristic being indicative of a mass reaction associated with the machine, and said torque characteristic being indicative of a torque of the machine.

4. A method, as set forth in claim 3, wherein said force characteristic includes said torque characteristic, and wherein the step of comparing said force characteristic includes the step of comparing said torque characteristic with a torque characteristic threshold.

5. A method, as set forth in claim 4, wherein the step of determining the payload weight includes the step of determining the payload weight in response to said machine being in motion, said torque characteristic comparison, and said established strut pressure.

6. A method, as set forth in claim 5, wherein the step of establishing an internal pressure of at least one of the payload struts includes the step of sensing an internal pressure of at least one of said playload support struts.

7. A method, as set forth in claim 5, wherein the step of comparing said torque characteristic with a torque characteristic threshold includes the step of determining said torque characteristic is at a desired level in response to said comparison.

8. A method, as set forth in claim 7, wherein the step of determining the payload weight includes the step of determining the payload weight in response to said sensed strut pressure sensed after said torque characteristic is at said desired level and said machine is in motion.

9. A method, as set forth in claim 5, wherein the step of sensing an internal pressure includes the step of sensing an internal pressure of each of said payload support struts in response to said torque characteristic being less than said torque characteristic threshold and said machine being in motion.

10. A method, as set forth in claim 9, wherein the step of determining the payload weight includes the step of determining the payload weight in response to each of said sensed strut pressures.

11. A method, as set forth in claim 5, wherein the machine includes a transmission having a plurality of gears, and further wherein the step of establishing a torque characteristic includes the step of determining the current gear of the transmission.

12. A method, as set forth in claim 11, wherein said torque characteristic threshold is a transmission gear threshold, and further wherein the step of sensing an internal pressure includes the step of sensing an internal pressure of said at least one strut in response to said current transmission gear being equal to or higher than said transmission gear threshold.

13. A method, as set forth in claim 5, wherein the step of establishing a torque characteristic includes the step of determining a speed of the machine.

14. A method, as set forth in claim 13, wherein said torque characteristic threshold is a machine speed threshold, and further wherein the step of sensing an internal pressure includes the step of sensing an internal pressure of said at least one strut in response to said machine speed being greater than said machine speed threshold.

15. A method, as set forth in claim 5, wherein the step of establishing a torque characteristic includes the step of determining a speed of the machine engine.

16. A method, as set forth in claim 15, wherein said torque characteristic threshold is an engine speed threshold, and further wherein the step of sensing an internal pressure includes the step of sensing an internal pressure of said at least one strut in response to said engine speed being greater than said engine speed threshold.

17. A method, as set forth in claim 5, wherein the step of establishing a torque characteristic includes the step of determining a torque associated with a drivetrain of the machine.

18. A method, as set forth in claim 17, wherein said torque characteristic threshold is a torque threshold, and further wherein the step of sensing an internal pressure includes the step of sensing an internal pressure of said at least one strut in response to said drivetrain torque being greater than said torque threshold.

19. A method, as set forth in claim 5, wherein the step of determining the payload weight in response to said sensed strut pressure includes the steps of:
   accumulating a plurality of sensed strut pressures from said at least one strut;
   averaging said plurality of sensed strut pressures from said at least one strut; and
   determining the payload weight in response to said averaged sensed strut pressure.

20. A method, as set forth in claim 5, wherein the step of establishing the machine is in motion includes the steps of:
   sensing a speed of the machine; and
   establishing the machine is in motion in response to said machine speed being greater than a motion threshold.

21. A method, as set forth in claim 20, wherein the machine includes a sensing device configured to sense a parameter indicative of a lateral velocity of said payload, and further wherein the step of establishing said mass reaction characteristic includes the step of determining a lateral velocity of the payload.

22. A method, as set forth in claim 3, wherein said force characteristic includes said mass reaction characteristic, and wherein the step of comparing said force characteristic includes the step of determining whether said mass reaction characteristic is less than a mass reaction characteristic threshold.

23. A method, as set forth in claim 22, wherein the step of determining the payload weight, further includes the step of determining the payload weight in response to said machine being in motion, said mass reaction characteristic being less than said mass characteristic threshold, and said established strut pressure.

24. A method, as set forth in claim 23, wherein the machine includes a sensing device configured to sense a parameter indicative of a pitch of the machine, and further wherein the step of establishing said mass reaction characteristic includes the step of determining a pitch of the machine.

25. A method, as set forth in claim 24, wherein said mass reaction characteristic threshold is a machine pitch threshold, and further wherein the step of sensing an internal pressure includes the step of sensing an internal pressure of said at least one strut in response to said sensed parameter being equal to or higher than said machine pitch threshold.

26. A method, as set forth in claim 25, wherein said sensing device includes one of an accelerometer, a inclinometer, a pitch sensor, and a pitch rate sensor.

27. A method, as set forth in claim 26, wherein said machine includes a dump body and a ground engaging portion, wherein said sensing device is configured to sense a parameter indicative of one of said dump body and said ground engaging portion.

28. An apparatus configured to determine the weight of a payload loaded onto a mobile machine, the mobile machine having a plurality of hydraulic struts in supporting relation to the payload, comprising: a plurality of sensing devices configured to sense the internal pressure of the struts, and responsively generate a pressure signal; a second sensing device configured to sense a parameter indicative of a dynamic force of the machine, and responsively generate a force characteristic signal; a controller configured to receive said pressure signals and said force indicative signal, establish whether the machine is in motion, compare said force characteristic signal with a force characteristic threshold, and determine the payload weight in response to said force characteristic comparison, said machine being in motion, and said sensed strut pressure.

29. An apparatus, as set forth in claim 28, wherein said controller in further configured to determine said payload weight in response to said sensed strut pressure sensed after said force characteristic is at a desired level and said machine is in motion.

30. An apparatus, as set forth in claim 28, wherein said force characteristic includes one of a mass reaction characteristic and a torque characteristic, said mass reaction characteristic being indicative of a mass reaction associated with the machine, and said torque characteristic being indicative of a torque of the machine.

31. An apparatus, as set forth in claim 30, wherein said force characteristic includes said torque characteristic, and wherein said controller is further configured to compare said torque characteristic with a torque characteristic threshold.

32. An apparatus, as set forth in claim 31, wherein the machine includes a transmission having a plurality of gears, and said second sensing device is configured to sense a current gear of the transmission, said torque indicative parameter being said current gear, and said torque characteristic threshold being a transmission gear threshold.

33. An apparatus, as set forth in claim 32, wherein said controller is further configured to determine the payload weight in response to said current gear being greater than or equal to said transmission gear threshold, said machine being in motion, and said sensed strut pressure.

34. An apparatus, as set forth in claim 31, wherein said second sensing device is configured to sense a speed of the machine, said torque indicative parameter being said machine speed, and said torque characteristic threshold being a speed threshold.

35. An apparatus, as set forth in claim 34, wherein said controller is further configured to determine the payload weight in response to said machine speed being greater than or equal to said speed threshold, said machine being in motion, and said sensed strut pressure.

36. An apparatus, as set forth in claim 31, wherein the machine has an engine, and said second sensing device is configured to sense a speed of the engine, said torque indicative parameter being said engine speed, and said torque characteristic threshold being a speed threshold.

37. An apparatus, as set forth in claim 36, wherein said controller is further configured to determine the payload weight in response to said engine speed being greater than or equal to said speed threshold, said machine being in motion, and said sensed strut pressure.

38. An apparatus, as set forth in claim 31, wherein said machine has a drivetrain, wherein said second sensing device is configured to sense a torque of the drivetrain, said torque indicative parameter being said drivetrain torque, and said torque characteristic threshold being a torque threshold.

39. An apparatus, as set forth in claim 38, wherein said controller is further configured to determine the payload weight in response to said drivetrain torque being less than said torque threshold, said machine being in motion, and said sensed strut pressure.

40. An apparatus, as set forth in claim 38, wherein said force characteristic includes said mass reaction characteristic, and wherein said controller is further configured to compare said mass reaction characteristic with a mass reaction characteristic threshold.

41. An apparatus, as set forth in claim 40, wherein said second sensing device is configured to sense a parameter indicative of a pitch of the machine and responsively deliver a pitch signal to said controller, said mass reaction characteristic being a machine pitch and said mass reaction characteristic being a machine pitch threshold.

42. An apparatus, as set forth in claim 40, wherein said second sensing device is configured to sense a parameter indicative of a pitch of a ground engaging portion of the machine and responsively deliver a ground engaging pitch signal to said controller, further including a third sensing device configured to sense a parameter indicative of a pitch of a dump body of the machine and responsively deliver a dump body pitch signal to said controller.

43. An apparatus, as set forth in claim 42, wherein said controller is further configured to receive said ground engaging pitch signal and said dump body pitch signal, determine a difference between said ground engaging pitch signal and said dump body pitch signal, compare said pitch difference with a delta pitch threshold, and determine said payload weight in response to said machine being in motion, said pitch difference being less than said delta pitch threshold, and said sensed strut pressures.

44. A method of determining the weight of the load supported by a strut of a mobile machine, the strut being disposed in supporting relation to a load carrying of the mobile machine, establishing the machine is in motion; establishing a torque characteristic indicative of a torque of the machine; comparing said torque characteristic with a torque characteristic threshold; establishing an internal pressure of the strut; and determining the load supported by the strut in response to said machine being in motion, said torque characteristic comparison and said established strut pressure.

45. A method, as set forth in claim 44, further including the steps of: determining the load supported by a plurality of machine struts; and determining a weight of the payload in response to said plurality of load determinations.

46. A method of determining the weight of a load supported by a strut of a mobile machine, the strut being disposed in supporting relation to the load carried by the mobile machine, comprising:

establishing the machine is in motion;

establishing a force characteristic indicative of a dynamic force associated with the machine;

comparing the force characteristic with a force characteristic threshold;

establishing an internal pressure of the strut; and determining the load supported by the strut in response to the machine being motion, the force characteristic comparison, and the established strut pressure.

47. The method, as set forth in claim 46, further including the steps of:

determining the load supported by a plurality of struts; and determining a weight of a payload in response to the plurality of load determinations.

48. The method, as set forth in claim 46, wherein the force characteristic includes a torque characteristic, and wherein the torque characteristic is indicative of a torque of the machine.

* * * * *